United States Patent [19]
Dwight

[11] 3,963,217
[45] June 15, 1976

[54] LINE TENSIONING SYSTEM

[76] Inventor: Bernard L. Dwight, 507 W. "M" St., Springfield, Oreg. 97477

[22] Filed: Nov. 11, 1974

[21] Appl. No.: 522,451

[52] U.S. Cl. .......................... 254/185 R; 242/75.53
[51] Int. Cl.² ........................................... B66D 1/26
[58] Field of Search ........... 254/185 R, 185 B, 172, 254/184, 183; 242/75.53

[56] References Cited
UNITED STATES PATENTS

| | | | |
|---|---|---|---|
| 2,064,295 | 12/1936 | Crane | 254/172 |
| 2,763,467 | 9/1956 | Doolittle et al. | 254/172 |
| 3,346,237 | 10/1967 | Erickson et al. | 254/185 B |
| 3,378,232 | 4/1968 | McIntyre | 254/185 B |

*Primary Examiner*—M. H. Wood, Jr.
*Assistant Examiner*—R. Schrecengost
*Attorney, Agent, or Firm*—Dowrey & Cross

[57] ABSTRACT

This invention relates to a fluid system employing fixed and variable displacement pump-motors for cable tensioning and braking in a yarder cable hauling device. More particularly, the system includes a fixed displacement fluid pump-motor mechanically connected with the haulback cable drum of a yarder in combination with a variable displacement fluid pump-motor driven by the yarder engine for maintaining a selectable pressure differential across the fixed displacement pump-motor, thereby providing cable tension and regenerative braking on the haulback cable drum via the variable displacement fluid pump-motor. In one embodiment first and second fixed displacement fluid pump-motors are mechanically connected to the main line and haulback drums, respectively, to obtain cable tensioning and regenerative braking via the variable displacement unit in both directions of cable hauling. In a second embodiment a single fixed displacement pump-motor, mechanically connected with the haulback drum, is employed to provide cable tensioning and regenerative braking with the yarder engine via the variable displacement unit in only one direction of cable hauling.

30 Claims, 2 Drawing Figures

LINE TENSIONING SYSTEM

BACKGROUND OF THE INVENTION

1. Field of the Invention

This invention relates to line tensioning systems and, more particularly, to a hydraulic fluid system for providing regenerative braking and cable tensioning in a yarder cable hauling device.

2. Description of the Prior Art

Hydraulic regenerative braking systems for cable hauling apparatus are known in the prior art. For example, U.S. Pat. No. 3,346,237 to Erickson discloses a logging yarder having a system for hydraulically braking one cable drum of a yarder while providing supplemental driving force to the other drum including a pair of variable displacement motors mechanically connected with the main line drum and the haulback drum, respectively. While each of the variable displacement motors are said to be convertible to a fixed displacement unit, the Erickson patent fails to disclose means for maintaining a pre-determined selectable tension in the cable while also providing regenerative braking, or means for tensioning the cable when the yarder power source is not driving the cable drums.

SUMMARY OF THE INVENTION

It is a general object of this invention to provide a fluid displacement system for providing a pre-selected force and regenerative braking to a movable element by employing a fixed displacement pump-motor in combination with a variable displacement pump-motor driven by the system prime mover.

More particularly, it is an object of this invention to provide a fluid displacement system for a cable hauling device for a log yarder, which employs a fixed displacement pump-motor mechanically connected to the haulback drum of the yarder in combination with a variable displacement pump-motor driven by the yarder engine and connected in a fluid circuit loop with the fixed displacement pump-motor for maintaining a pre-selected pressure on one side of the circuit loop providing, thereby, cable tensioning and regenerative braking to the yarder.

Still another object of this invention is to provide a fluid displacement system for a log yarder including a fluid circuit loop having a pair of fixed displacement pump-motors respectively mechanically connected and with the main line and haulback drums of the yarder, and a variable displacement pump-motor driven by the yarder engine for maintaining a preselected pressure on one side of the loop to provide constant cable tensioning and regenerative braking between the main line and haulback drums of the yarder.

The means by which the foregoing objects and other advantages which will be apparent to those skilled in the art are accomplished are set forth in the following specification and claims and illustrated in the accompanying drawings.

DESCRIPTION OF THE PREFERRED EMBODIMENTS

Figure 1:
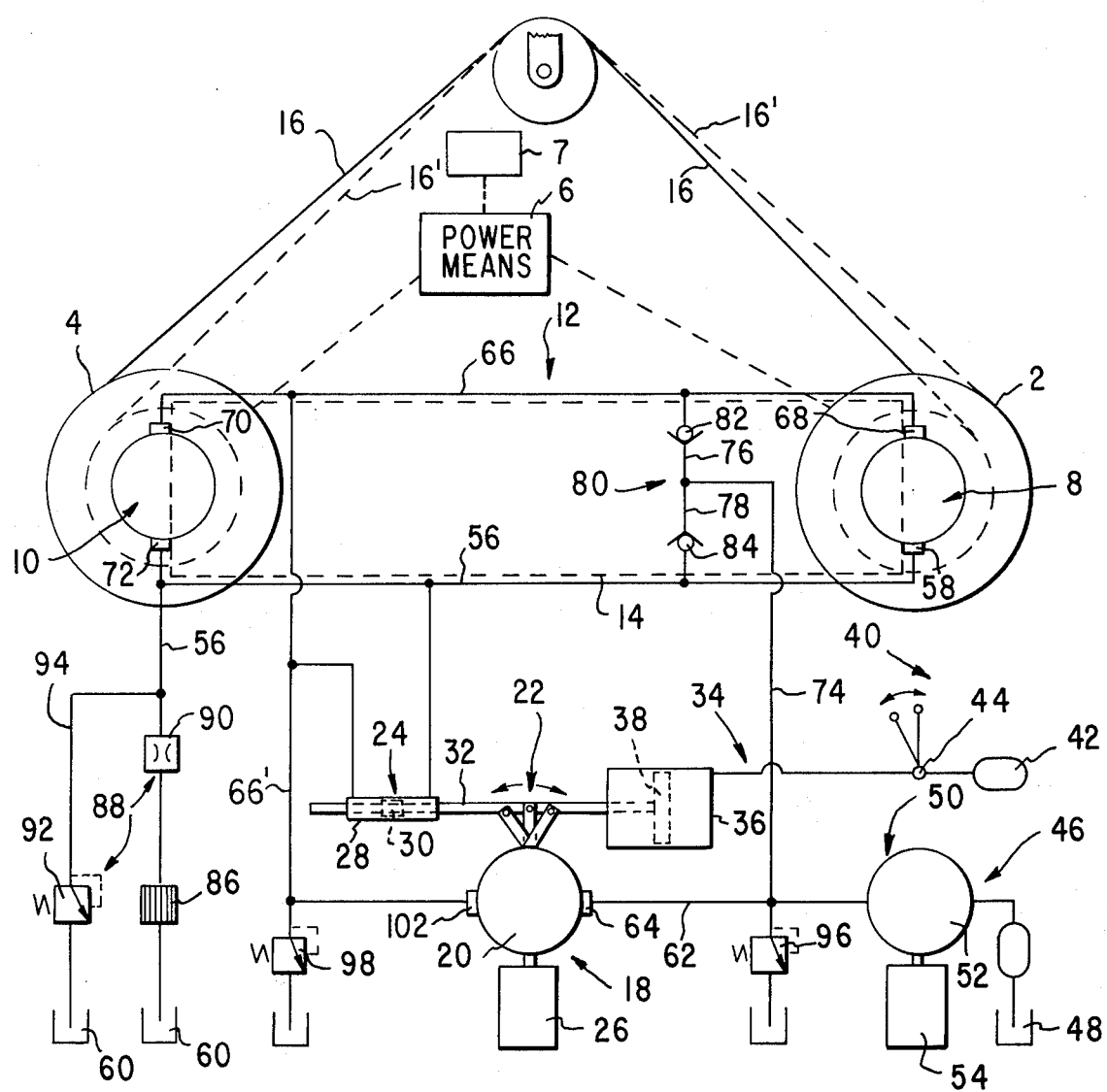
FIG. 1 is a schematic illustration of the subject invention employing a pair of fixed displacement pump-motor units.

FIG. 1 discloses a fluid displacement system incorporating fixed and variable pump-motor units as applied to a cable hauling apparatus such as used in a log yarder. More particularly, the system of FIG. 1 includes first and second movable elements, such as first cable winding drum 2 and second cable winding drum 4. Both drums 2 and 4 are selectively drivable by power means 6 which in turn is driven by the yarder engine or prime mover 7. One type of suitable power means for driving drums 2 and 4 would be a mechanical transmission system such as disclosed in U.S. Pat. No. 3,346,237.

Mechanically connected to drums 2 and 4 are first and second fixed displacement fluid means 8 and 10 for applying a mechanical rotational force to the respective drums in response to fluid pressure being applied thereto and for maintaining a fixed ratio between the quantity and direction of fluid displaced therein and the amount and direction of displacement of the associated drum. First and second fixed displacement fluid means 8 and 10 may take the form of fixed displacement hydraulic actuators or motor-pumps. The motor-pumps are interconnected by a working fluid conduit means 12 (to be more fully discussed subsequently) one portion of which forms a fluid circuit loop following the dotted line indication 14. Fixed displacement means 8 and 10 are adapted to displace fluid in the same direction around loop 14 when drums 2 and 4 are operated to haul in and pay out the system cable, thereby simultaneously providing line tension control and hydraulic braking in which fluid energy produced by braking one drum is converted into fluid energy for supplementing the driving force applied to the other drum. Regardless of whether fixed displacement means 8 and 10 are acting as pumps or motors, as long as fluid pressure is maintained in the loop, the drums 2 and 4 will maintain tension on the cable in direct relation to the torque of the displacement means and their mechanical connection to the drums. Furthermore, line tension may be controlled when the drums are inoperative.

Cable means 16 extends between drums 2 and 4 and is adapted to be wound on one drum while simultaneously being unwound from the other drum. Due to the varying diameter of the cable drum as the cable means is wound and unwound therefrom (illustrated by dotted lines 16') it can readily be seen that drums 2 and 4 do not travel at the same speed if the total amount of cable unwound remains constant. As a result of this difference in speed, fixed displacement means 8 and 10 do not displace exactly the same volume of fluid thereby requiring fluid to be added to or withdrawn from the fluid circuit loop 14 in order to maintain constant line tension. Line tension control is provided by variable displacement means 18 which supplies fluid to and received fluid from fixed displacement means 8 and 10. A pre-selected line tensioning force is thus maintained on the drums, regardless of the direction of movement of the drums, by controlling the direction and quantity of fluid flow to and from the loop 14 in response to the fluid pressure differential across the first and second fixed displacement means 8 and 10 (that is to say the pressure differential which exists in fluid circuit loop 14).

More particularly, the variable displacement means 18 includes a variable displacement actuator or pump-motor 20 having a movable control means 22 for varying the fluid displacement thereof when the control means 22 is displaced. The variable displacement means 18 further includes a differential operator means 24 connected to the movable control means 22 for modifying its position to control, thereby, the quantity and direction of fluid displaced by the variable displacement pump-motor 20 to maintain a pre-selected fluid pressure differential across the fluid circuit loop 14. Power is provided to the variable displacement pump-motor 20 by means of any constant speed power means indicated at 26 which will normally be driven by the yarder engine 7.

Referring to FIG. 1, the differential operator means 24 includes a double acting cyclinder 28 in fluid communication at the opposite ends thereof with opposite sides of fluid circuit loop 14. An operator piston 30 is mounted for reciprocating travel in the operator cylinder. The piston rod 32 connects the operator piston 30 with the movable control means 22 as illustrated. Since the effective areas of the opposed surfaces of piston 30 are equal, piston rod 32 tends to move to the right (as illustrated in FIG. 1) when the upper portion of circuit loop 14 is at a higher pressure than the lower portion and vice versa. The variable displacement pump-motor 20 is thus adapted to respond to movement of the operator piston 30 in a manner to vary or even reverse the flow of fluid through variable displacement pump-motor 20 so as to maintain a pre-determined pressure differential in the fluid circuit loop 14. In this manner, variable displacement means 18 automatically removes any excess or makes up any deficiency of fluid in loop 14 caused by unequal rotation of cable drums 2 and 4 and, hence, controls the tension.

The system of FIG. 1 further includes a force varying means 34 for selectively controlling the amount of fluid pressure applied to the first and second fixed displacement means 8 and 10. More particularly, variation in the fluid pressure supplied to the circuit loop 14 by variable displacement motor-pump 20 will, of course, control the amount of fluid pressure applied to the first and second fixed displacement means 8 and 10 which in turn maintains cable means 16 under a predetermined tension. Accordingly, force varying means 34 permits adjustment in the cable tension by varying the pressure applied to said first and second fixed displacement means in a manner presently to be described. The force varying means 34 includes a control cylinder 36 and a control piston 38 connected to the piston rod 32 and mounted for travel within the control cylinder 36. The force varying means further includes control pressure supply means 40 for applying a selectable pressure to the control cylinder 36 and piston 38. This arrangement of the force varying means 34 permits the preselected pressure differential maintained in the circuit loop 14, and thus the tension in the cable 16, to be varied by changing the pressure applied to control piston 38.

The control pressure supply means 40 is further characterized by a source of pressurized control fluid 42 and a manually controlled valve means 44 connecting the source of pressurized control fluid 42 with the control cylinder 36 for varying the pressure supplied to the control cylinder in accordance with a manual setting of the manually controlled valve means 44. The control fluid source 42 may be a separate pneumatic pressure system if desired.

As further illustrated in FIG. 1, the system includes a pressurized working fluid means 46 for supplying working fluid at a constant pressure, for example 200 psi, to the first and second fixed displacement means 8 and 10 and to the variable displacement means 18. The pressurized working fluid means 46 includes a source of working fluid 48 and a working fluid pump means 50 connected therewith. The pump means 50 includes a fixed displacement pump 52 and a constant speed power means indicated at 54 which will normally be driven by the yarder engine 7 as described for pump-motor 20.

As illustrated in FIG. 1, the fixed and variable displacement pumpmotors are interconnected by a fluid circuit which constitutes the working fluid conduit means 12 referred to above. Specifically, the conduit means includes a first conduit section 56 for connecting a first port 58 (referred to hereinafter as the first fixed displacement port) of fixed displacement means 8 with a fluid pressure sump 60. Fluid pressure sump 60 may, of course, be connected with or serve as the source of working fluid 48. A second conduit section 62 connects port 64 (first variable displacement port) on variable displacement pump-motor 20 with the presurized working fluid means 46. The working fluid conduit means further includes a third conduit section 66 connected to a second port 68 (second fixed displacement port) of fixed displacement means 8 with port 70 (fourth fixed displacement port) of fixed displacement means 10. Fixed displacement means 10 includes another port 72 (third fixed displacement port) which is connected with the first conduit section 56. Ports 58, 68, 70 and 72 are interconnected by first and third conduit sections 56, 66 to thereby form the fluid circuit loop 14. A branch of conduit section 66 (indicated as 66') is connected with a second port 102 (second variable displacement port) of variable displacement means 18. It is by means of the provision of the variable displacement motor-pump 20, sensitive to the pressure differential in circuit loop 14 and adapted to maintain the pressure differential therein, that the subject circuit is adapted to maintain cable tension while also providing regenerative braking.

Referring again to the working fluid conduit means 12, FIG. 1 illustrates that means 12 includes a fourth conduit section 74 for providing a constant supply of working fluid to circuit loop 14. Section 74 is connected at one end with the second conduit section 62 and divided at the other end to form a first branch 76 connected with third conduit section 66 and a second branch 78 connected with a first conduit section 56. The illustrated fluid system includes a check valve means 80 for permitting working fluid to pass from the fourth conduit section 74 into either the first or third conduit sections 56 or 66 but not in the reverse direction. Check valve means 80 includes first and second check valves 82 and 84 positioned within first and second branches 76 and 78 respectively.

The working fluid conduit means 12 also includes a heat exchanger 86 and a discharge pressure and flow control means 88 connected in the first conduit section 56 for regulating the pressure therein and for regulating the flow of fluid through the heat exchanger 86 into fluid pressure sump 60. The discharge pressure and flow control means 88 includes a flow control valve 90 connected in series with heat exchanger 86 and a pilot operated relief valve 92 connected in a branch 94 of first conduit section 56 ahead of the serial connection of the flow regulator 90 and heat exchanger 86, all as illustrated in FIG. 1. The working fluid supplied by pressurized working fluid means 46 is maintained at a constant pressure by means of a pilot operated relief valve 96 connected in second conduit section 62. A third pilot operated relief valve 98 is connected with the third conduit section 66. Pilot operated relief valve 96 is typically set at 200 psi while pilot operated relief valves 92 and 98 are typically set at 400 psi and 3000 psi, respectively.

The manner of operation of the disclosed embodiment of FIG. 1 is evident from the above description. In particular, first and second cable winding drums 2 and 4 are independently and selectively driven by the yarder engine 7 through power means 6 to wind cable means 16 on one drum while simultaneously unwinding cable from the other drum. The fluid displacement system of the subject invention is adapted to permit the cable means to be subjected to a pre-selected and constant tensioning force while simultaneously providing a regenerative braking capability whereby the energy produced by braking one cable drum is converted into fluid energy adapted to supplement the driving force applied to the other drum.

During a logging operation for instance, the drum 4 may be the main line drum and drum 2 the haulback drum. When the yarder engine 7 and power means 6 are mechanically driving the main line drum 4 to bring in a turn of logs, the main line and the haulback line constituting the cable means 16, causes the haulback drum 2 to turn in an unspooling direction. Under these conditions, fixed displacement means 8 acts as a pump and the fixed displacement means 10 acts as a motor. The fixed displacement means 8 acts also as a brake on the drum 2 maintaining constant tension in the cable and the pressure fluid therefrom is supplied to the fixed displacement means 10. As will be explained, when the fixed displacement means 8 produces an excess of fluid pressure over and above the requirements of the fixed displacement means 10, the excess pressure is used to provide regenerative power to the yarder engine through the reversible variable displacement means 20. It will be recognized that line tensioning effort also may be exerted when the yarder engine is not driving either drum while still driving the variable displacement pump motor.

Due to the varying diameters of cable drums as the cable is spooled and unspooled, the speed of the displacement means acting as a pump (in this case, unit 8) will vary requiring fluid to be continuously added or removed from the high pressure side of the loop 14 (in this case, conduit 66) if a constant pressure and hence constant cable tension is to be maintained. These conditions will be reversed, of course, when the power means is connected to drive the haulback drum 2 and the main line drum 4 is unspooling. As previously mentioned, regardless of which fixed displacement means 8 or 10 is the pump and which the motor, or whether the yarder engine is actually driving the drums, as long as constant pressure is maintained in the loop 14, constant tension will be maintained on the cable means in direct relation to the torque of the fixed displacement means.

During the logging operation when the variable displacement means is being driven by the yarder engine to add fluid to the conduit 66 and either the unit 8 or 10 is also pumping fluid into conduit 66 faster than it can pass through the unit acting as a motor, pressure will build up in the conduit. Fluid in conduit 66 cannot pass through check valve 82 but can pass through conduit 66' and third pilot operated relief valve 98 which should be set at approximately 3000 psi. Fluid pressure in line 66' will also be applied to the left side of piston 30 moving control means 22 to the right causing the variable displacement means 20 to reverse and pass fluid into conduit 62 to join the 200 psi working fluid system. During this operation, as the pressure in conduit 66 is being reduced to equal the pressure in conduit 56, the variable displacement means 20 is returning power to the yarder engine due to the regenerative braking of one of the drums.

During that part of the logging operation when there is surplus fluid in conduit 56 instead of 66, fluid will flow through pressure compensated flow control valve 90 and through heat exchanger 86 to sump 60. When maximum flow rate of flow control valve 90 is reached, pressure will build up in conduit 56. To equalize pressure in conduits 56 and 66, the pressure in conduit 56 cannot be lowered as was the case with conduit 66 because of the effects of check valve 84 and the 400 psi setting of relief valve 92; however, the pressure in conduit 66 can be raised to that in conduit 56. The only escape for fluid in conduit 56 will be through the first pilot operated relief valve 92. Due to the 400 psi setting of this valve, a 200 psi differential control pressure is applied to the right side of piston 30 to move control means 22 to the left, thereby causing the variable displacement means 20 to reverse so as to pass fluid into line 66' bringing pressure in line 66 up to the 400 psi pressure in line 56. The control pressure supply means 40, of course, may be used to cause the variable displacement means 20 to increase the pressure in conduit 66 to provide desired cable tensioning pressure. As will be appreciated, this also provides regenerative braking in both directions of operation. When pressure in conduits 56 and 66 equalizes, of course, the system is merely idling with no line tensioning and no regenerative braking effort being exerted.

The control pressure source 42 is normally charged with approximately 100 psi air pressure. Valve 44 is a hand operated pressure graduating valve which, in the present example, will selectively apply any pressure from 0 to 100 psi depending on the position of the control handle. The piston 38 has a large enough area so that the force delivered by the piston rod 32 to movable control means 22 when a full 100 psi pressure is used plus the differential control pressure force of 200 psi on the right side of piston 30 will equal the force delivered by 3000 psi on the left side of piston 30. These pressures are by way of example, of course, and may be varied as explained by adjusting the position of valve 44.

Figure 2:
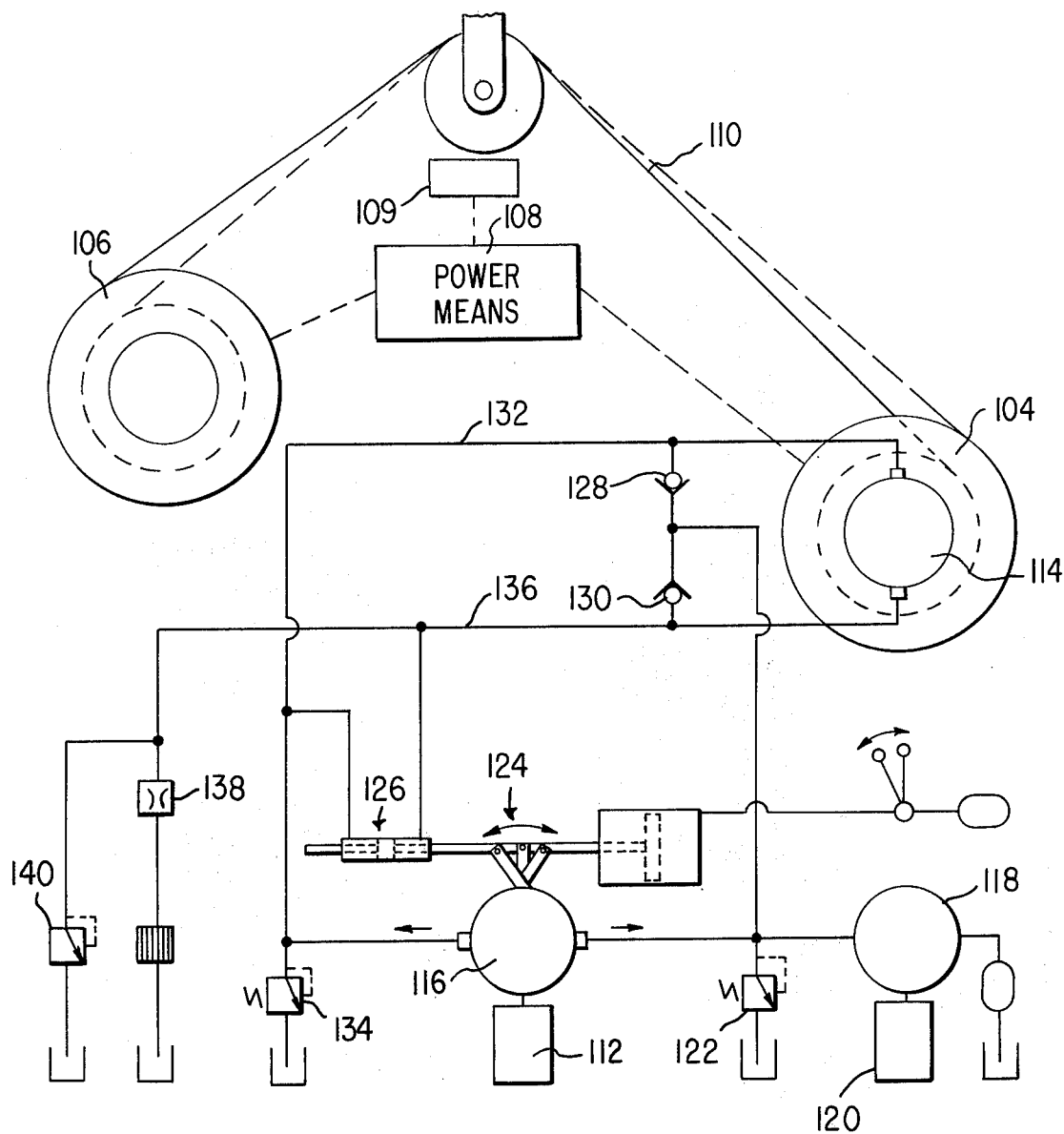
FIG. 2 is a schematic illustration of a second embodiment of the subject invention employing a single fixed displacement pump-motor unit.

FIG. 2 discloses a second embodiment of the subject invention in which the fluid displacement system is connected with a single movable element such as a cable haulback drum 104 of a yarder apparatus. The main line drum 106 and the haulback drum 104 are selectively and independently driven by power means 108 which in turn is driven by the yarder engine 109. A suitable type of yarder power means is disclosed in U.S. Pat. No. 3,346,237. More particularly, the embodiment of FIG. 2. permits a constant force to be applied to cable haulback drum 104 to maintain the cable means 110 under a pre-selected tension while at the same time permitting a regenerative feedback to the prime mover 109 through the power transmission means 112 which is drivingly connected to the prime mover. Regenerative braking and cable tensioning in this embodiment are, of course, accomplished in only one direction of operation, i.e., during the hauling in of a turn of logs by the main line drum 106. The details of FIG. 2 fluid displacement system are identical with the features of the FIG. 1 embodiment wherein the same elements are represented by the same symbols except that the second fixed displacement means 10 of the FIG. 1 embodiment has been eliminated. Accordingly, a first fixed displacement pump-motor 114 is mechanically connected with haulback drum 104 and hydraulically connected with a variable displacement pump-motor 116 by means of a fluid circuit which is identical with that of FIG. 1 save for the fluid connections to a second fixed displacement pump-motor unit.

As in the case of the FIG. 1 embodiment, the fixed displacement pump 118 is driven by a power transmission means 120 which is connected to the yarder engine 109 to provide a constant supply of pressure fluid at approximately 200 psi for the variable displacement means 116 and to either port of the fixed displacement means 114 through the check valves 128 and 130 shown. The pilot operated relief valve 122 will be set at 200 psi to dump excess fluid. The variable displacement means 116 will be driven at a constant speed by the yarder engine and the movable control means 124 will be operated as described for the control means 22 of FIG. 1. The differential operator means 126 operates in the same manner as described for the operator means 24 of FIG. 1 to control the volume and direction of the variable displacement means 116 to remove or add pressure fluid to the fluid circuit.

During the logging operation with main line drum 106 being powered by the yarder engine, cable is spooled off from the haulback drum 104 and the fixed displacement means 114 is caused to pump oil into line 132. The variable displacement means 116 is also, at this time, being driven by the yarder engine and adding fluid to the line 132. The fluid thus pumped cannot pass through check valve 128 but must escape through a second pilot operated relief valve 134 which should be set at approximately 3000 psi. The pressure fluid in line 132 will also be applied to the differential operator means 124 causing it to move to the right as viewed in FIG. 2 as the pressure rises. The application of pressure on the control means 124 results in the reversal of the variable displacement means 116 causing the pressure in line 132 to decrease to the 200 psi charge pressure in line 136 and a regenerative power application to the prime mover 109 back through the variable displacement means 116.

When the yarder engine 109 is connected to drive the haulback drum 104 to spool the cable thereon the fixed displacement means 114 will pump fluid into line 136. The pressure fluid will pass through flow control valve 138 until it reaches its maximum flow causing pressure to build up in line 136. Since fluid cannot pass through check valve 130, it escapes through the third pilot operated relief valve 140 which should be set at approximately 400 psi to give a 200 psi differential over charge pressure in line 132. The 400 psi is applied to the right side of the differential operator 126 and overcomes the 200 psi charge pressure on the opposite side of the cylinder to cause the movable control means 124 to move to the left, resulting in a reversal of the variable displacement means 116. Fluid is thus pumped into line 132 until the pressure reaches the 400 psi level, equalizing the pressure in lines 132 and 136. In this mode of operation, the system is merely idling with no constant tensioning and no regenerative braking effort.

It may be readily appreciated by those skilled in the art that the embodiment of FIG. 2 may be modified such that only the main line drum 106 is powered directly by the prime mover 109 and the haulback drum 104 is driven by means of the variable displacement means 116 — taking its power from the prime mover as described. The advantage of the arrangement would be the elimination of the need fo a direct mechanical connection between the prime mover and the haulback drum.

With the above description in mind, it will be realized that both the FIG. 1 and 2 systems may be applied to a single yarder system with certain apparent advantages. The two systems would be entirely independent except for perhaps drawing fluid from the same sump and the prime mover would be mechanically connected to only one of the drums, e.g., the main line drum. The system of FIG. 1 would accomplish both line tensioning and regenerative braking in both directions under this arrangement and the FIG. 2 system would accomplish driving the haulback drum with no direct mechanical connection.

From the foregoing it will be apparent to those skilled in the art that the present invention is subject to modification well within the perview of the appended claims. Those skilled in the art will also appreciate that new and unobvious results are obtained in the nature of improved efficiency and effectiveness in hydraulic control of cable handling systems.

What is claimed is:

1. A line tensioning system, comprising:
    powered drum means engaging the line at opposite ends thereof for alternately spooling and unspooling the line;
    fluid actuated fixed displacement means connected with at least one of said drum means for applying a force to said one drum means, so as to exert tensioning effort upon the line when unspooled therefrom; and
    variable displacement means in fluid communication with said fixed displacement means for supplying fluid to and receiving fluid from said fixed displacement means and for maintaining a constant fluid pressure differential between the pressure of said fluid supplied to said fixed displacement means and said fluid received from said fixed displacement means in spite of fluctuations in the pressure of the fluid either received from or supplied to said fixed displacement means, whereby a uniform tensioning effort is exerted on said line during spooling and unspooling by said one drum means.

2. A line tensioning system as defined in claim 1, including a second fixed displacement means for applying a force to the other of said drum means so as to exert tensioning effort upon the line when unspooled therefrom, said variable displacement means further being operable for supplying fluid to and receiving fluid from said second fixed displacement means and for maintaining a constant fluid pressure differential between the pressure of the fluid supplied to said second fixed displacement means and the pressure of the fluid received from said second fixed displacement means in spite of fluctuations in the pressure of the fluid either received from or supplied to said fixed displacement means occurring during said spooling and unspooling operation, whereby a uniform tensioning effort is exerted on said line during spooling and unspooling by said other drum means.

3. A line tensioning system comprising:
powered drum means engaging the line at opposite ends thereof for alternately spooling and unspooling the lines; and
a first fluid actuated fixed displacement means connected with at least one of said drum means for applying a force to said one drum means, so as to exert tensioning effort upon the line when unspooled therefrom; and
a second fluid actuated fixed displacement means for applying a force to another of said drum means so as to exert a tensioning effort upon the line when unspooled therefrom; and
a variable displacement means for supplying fluid to and receiving fluid from said first and second fixed displacement means for controlling the amount of fluid displaced by said first and second fixed displacement means as the line is unspooled from either drum means, to thereby control the tensioning effort exerted.

4. A combination line tensioning and regenerative braking system, comprising
a. a first and second winding means for winding and unwinding a line extending therebetween such that as the line is wound onto one winding means it simultaneously is unwound from the other winding means;
b. power means for alternately driving said first and second winding means;
c. fluid actuated fixed displacement means connected with at least one of said winding means for applying braking effort to said one winding means, so as to exert tensioning effort upon the line as it is unwound therefrom;
d. fluid regenerative braking means for converting energy produced by braking the one winding means into energy for supplementing driving force applied to the other winding means by said power means, said fluid regenerative braking means comprising variable displacement means operatively connected with said power means, fluid circuit means interconnecting said fixed and variable displacement means, said variable displacement means being operable for maintaining a preselected fluid pressure withing said fluid circuit means such that preselected braking effort is maintained on said one winding means, to thereby control line tension, and further being operable for converting excess fluid pressure in said fluid circuit means into energy which is returned to said power means for supplementing driving force applied to the other winding means.

5. The line tensioning system as defined in claim 4, wherein said variable displacement means controls the direction and quantity of fluid flow in said fluid circuit means in response to the fluid pressure differential across said fixed displacement means.

6. A line tensioning system as defined in claim 5, wherein said variable displacement means includes differential operator means responsive to said fluid pressure differential for controlling the quantity and direction of fluid displaced by said variable displacement means, so as to maintain a pre-selected fluid pressure differential across said fixed displacement means.

7. A line tensioning system for tensioning a line extending between two winding devices between which the line is moved in one direction and then in a reverse direction as it is wound upon and unwound from one and then the other winding device, comprising:
fixed displacement hydraulic actuator means connected with one of the winding devices to exert tensioning effort upon the line as it is wound upon the other winding device and thereby moved in the one direction, and variable displacement hydraulic actuator means in fluid communication with said fixed displacement hydraulic actuator means for conveying fluid to and receiving fluid from said fixed displacement means and for maintaining a preselected constant pressure differential between the pressure of the fluid conveyed to and the pressure of the fluid received from said fixed hydraulic actuator means during said winding and unwinding operation, whereby a uniform tensioning effort is exerted by said fixed displacement hydraulic actuator means.

8. A line tensioning system for tensioning a line extending between two winding devices between which the line is moved in one direction and then in a reverse direction as it is wound upon and unwound from one and then the other winding device, comprising:
fixed displacement hydraulic actuator means connected with one of the winding devices to exert tensioning effort upon the line as it is wound upon the other winding device and thereby moved in the one direction; and
means for maintaining fluid pressure upon said fixed displacement hydraulic actuator means to thereby exert tensioning effort upon the line when the other winding device is stationary; and
variable displacement hydraulic actuator means in fluid communication with said fixed displacement hydraulic actuator means for controlling the amount of hydraulic fluid displaced by said fixed displacement hydraulic actuator means, to thereby control the tensioning effort exerted by said fixed displacement hydraulic actuator means.

9. A line tensioning system for tensioning a line extending between two winding devices between which the line is moved in one direction and then in a reverse direction as it is wound upon and unwound from one and then the other winding device, comprising:
fixed displacement hydraulic actuator means connected with one of the winding devices to exert tensioning effort upon the line as it is wound upon the other winding device and thereby moved in the one direction; and
variable displacement hydraulic actuator means in fluid communication with said fixed displacement hydraulic actuator means for controlling the amount of hydraulic fluid displaced by said fixed displacement hydraulic actuator means, and for selectively increasing and decreasing the tensioning effort exerted by said fixed displacement hydraulic actuator means.

10. A line tensioning system comprising:
powered drum means engaging the line at opposite ends thereof for alternately spooling and unspooling the line;
fluid actuated fixed displacement means connected with at least one of said drum means for applying a force to said one drum means, so as to exert tensioning effort upon the line when unspooled therefrom; and variable displacement means supplying fluid to and receiving fluid from said fixed displacement means for controlling tensioning effort exerted, said variable displacement means including a variable displacement pump motor in fluid communication with said fixed displacement means, and differential operator means for controlling the quantity and direction of fluid supplied to and received from said fixed displacement means by said variable displacement pump motor.

11. A line tensioning system as defined in claim 10 wherein said variable displacement pump motor is driven by a constant speed prime mover.

12. A line tensioning system as defined in claim 10 wherein said fixed displacement means includes first and second fluid ports communicating with said variable displacement pump motor, and wherein said differential operator means includes first pressure actuated cylinder means responsive to the pressure differential between said first and second fluid ports for controlling the direction of displacement of said variable displacement pump motor.

13. A line tensioning system as defined in claim 12 further including force varying means for varying the amount of force applied to said one drum means.

14. A line tensioning system as defined in claim 13, wherein said force varying means includes second pressure actuated cylinder means controlling the pressure differential between said first and second ports, and control pressure supply means for actuating said second cylinder means to maintain a preselected differential between said first and second fluid ports.

15. A line tensioning system as defined in claim 14, wherein said control pressure supply means includes a source of pressurized control fluid, and manually controlled valve means connecting said source of pressurized control fluid with said second cylinder means for selectively varying the pressure supplied to said second cylinder means.

16. A line tensioning system as defined in claim 10, further including pressurized working fluid means for supplying working fluid at a constant pressure to said fixed displacement means and to said variable displacement means.

17. A line tensioning system as defined in claim 16, wherein said system further includes a check valve means for preventing reverse flow of fluid from said fixed displacement means to said pressurized working fluid means.

18. A line tensioning system as defined in claim 16, wherein said pressurized working fluid means includes a fixed displacement pump and a constant speed prime mover.

19. A line tensioning system as defined in claim 16, wherein said fixed displacement means includes first and second fixed displacement ports and said variable displacement means includes first and second variable displacement ports, and further including working fluid conduit means for interconnecting said fixed and variable displacement means with said pressurized working fluid means, said working fluid conduit means including a fluid pressure sump, a first conduit section connecting said first fixed displacement port with said fluid pressure sump, a second conduit section connecting said first variable displacement port with said pressurized working fluid means and a third conduit section connecting said second fixed displacement port with said second variable displacement port.

20. A line tensioning system as defined in claim 19, wherein said working fluid conduit means includes a heat exchanger and a discharge pressure and flow control means connected in said first conduit section for regulating the pressure in said first conduit section and for regulating the flow of fluid through said heat exchanger.

21. A line tensioning system as defined in claim 20, wherein said working fluid conduit means further includes a fourth conduit section connected with said second conduit section, said fourth conduit section including a first branch connected with said third conduit section, and further including a check valve means for permitting working fluid to pass in one direction from said fourth into either said first or third conduit section.

22. A line tensioning system as defined in claim 21, wherein said check valve means includes first and second valves positioned within said first and second branches, respectively, of said fourth conduit section.

23. A line tensioning system as defined in claim 22, wherein said pressurized working fluid means includes a pilot operated relief valve connected with said second conduit section for maintaining the working fluid at a constant pressure.

24. A line tensioning system as defined in claim 10, further comprising second fluid actuacted fixed displacement means for applying a force to the other of said drum means, so as to exert tensioning effort upon the line when unspooled therefrom, power means alternately driving said drum means, said power means being operatively connected with said variable displacement means to form a power regenerative braking system in which energy produced by braking either of the drum means is converted into power for supplementing the driving force applied by said power means for driving the other drum means, said power regenerative braking system including a circuit loop between the first-mentioned and second fixed displacement means, said first-mentioned fixed displacement means including first and second fixed displacement ports through which the fluid displaced thereby is passed, said second fixed displacement means including third and fourth fixed displacement ports through which the fluid displaced thereby is passed, said first and third fixed displacement ports being in fluid communication with each other and said second and fourth fixed displacement ports being in fluid communication with each other to form said circuit loop; said variable displacement means being in fluid communication with said circuit loop for supplying fluid to and receiving fluid from said loop for controlling the tensioning effort exerted.

25. A line tensioning system as defined in claim 24, further including pressurized working fluid means for supplying working fluid at a constant pressure to said first-mentioned and second fixed displacement means and to said variable displacement means, and wherein said variable displacement means includes a variable displacement pump motor in fluid communication with said pressurized working fluid means and said first and third fixed displacement ports, said pump motor being operatively connected with said power means, and differential operator means for varying the direction and quantity of displacement of said variable displacement pump motor in response to the pressure differential between said first and third ports and said second and fourth ports.

26. A line tensioning system as defined in claim 25, further including force varying means for varying the amount of force applied to said drum means.

27. A line tensioning system as defined in claim 26, wherein said differential operator means includes an operator cylinder and piston mounted within said cylinder, said operator piston being connected with said variable displacement pump motor for varying the displacement thereof, said operator piston being subjected on opposing sides thereof to the fluid pressure in said first and third ports and said second and fourth ports, respectively, and wherein said force varying means includes a control cylinder, a control piston mounted for travel within said control cylinder and connected with said operator piston, and control pressure supply means connected with said control cylinder for applying a selectable pressure to said control cylinder to thereby apply a selectable pressure to said operator piston, whereby the pre-selected pressure differential maintained between said first and third ports and said second and fourth ports may be varied.

28. A line tensioning system for tensioning a line extending between two winding devices between which the line is moved in one direction and then in a reverse direction as it is wound upon and unwound from one and then the other winding device, comprising:
 power means for alternately applying driving force to the winding devices;
 fixed displacement hydraulic actuator means connected with one of the winding devices to exert tensioning effort upon the line as it is wound upon the other winding device and thereby moved in the one direction; and
 variable displacement hydraulic actuator means responsive to the tensioning effort exerted by said fixed displacement hydraulic actuator means for controlling the tensioning effort exerted, said variable displacement hydraulic actuator means being operatively connected with said power means such that tensioning effort exerted when the line is wound upon the other winding device supplements driving force applied to the other winding device.

29. A line tensioning system for tensioning a line extending between two winding devices between which the line is moved in one direction and then in a reverse direction as it is wound upon and unwound from one and then the other winding device, comprising:
 first fixed displacement hydraulic actuator means connected with one of the winding devices to exert tensioning effort upon the line as it is wound upon the other winding device and thereby moved in the one direction;
 second fixed displacement hydraulic actuator means connected with the other winding device to exert tensioning effort upon the line as it is wound upon the one winding device and thereby moved in the reverse direction; and
 variable displacement hydraulic actuator means responsive to the tensioning effort exerted by said first and second fixed displacement hydraulic actuator means for controlling the tensioning effort exerted.

30. The tensioning system of claim 29 further comprising conduit means hydraulically interconnecting the first-mentioned and second fixed displacement hydraulic actuator means, said conduit means having first and second sections between which a fluid pressure differential is established during operation of the first-mentioned and second fixed displacement means, said variable displacement hydraulic actuator means being responsive to said fluid pressure differential.

* * * * *